United States Patent
Blumenau et al.

(10) Patent No.: US 9,803,270 B2
(45) Date of Patent: Oct. 31, 2017

(54) METHOD FOR HOT-DIP COATING OF A STEEL FLAT PRODUCT

(71) Applicants: ThyssenKrupp Steel Europe AG, Duisburg (DE); Outokumpu Nirosta GmbH, Krefeld (DE)

(72) Inventors: Marc Blumenau, Hagen (DE); Christopher Gusek, Iserlohn (DE); Fred Jindra, Lennestadt (DE); Rudolf Schoenenberg, Daphne, AL (US); Hans-Joachim Krautschick, Solingen (DE)

(73) Assignees: ThyssenKrupp Steel Europe AG, Duisburg (DE); Outokumpu Nirosta GmbH, Krefeld (DE)

( * ) Notice: Subject to any disclaimer, the term of this patent is extended or adjusted under 35 U.S.C. 154(b) by 506 days.

(21) Appl. No.: 14/377,337

(22) PCT Filed: Dec. 13, 2012

(86) PCT No.: PCT/EP2012/075402
§ 371 (c)(1),
(2) Date: Aug. 7, 2014

(87) PCT Pub. No.: WO2013/117273
PCT Pub. Date: Aug. 15, 2013

(65) Prior Publication Data
US 2015/0345002 A1    Dec. 3, 2015

(30) Foreign Application Priority Data
Feb. 8, 2012 (DE) .................. 10 2012 101 018

(51) Int. Cl.
| | |
|---|---|
| *C23C 2/02* | (2006.01) |
| *C21D 9/46* | (2006.01) |
| *C22C 38/00* | (2006.01) |
| *C23C 2/06* | (2006.01) |
| *C23C 2/28* | (2006.01) |
| *C23C 2/40* | (2006.01) |
| *C22C 38/40* | (2006.01) |
| *B32B 15/01* | (2006.01) |
| *C22C 18/00* | (2006.01) |
| *C22C 18/04* | (2006.01) |
| *C22C 21/02* | (2006.01) |
| *C22C 21/10* | (2006.01) |
| *C22C 38/44* | (2006.01) |
| *C22C 38/58* | (2006.01) |

(52) U.S. Cl.
CPC .............. *C23C 2/02* (2013.01); *B32B 15/012* (2013.01); *B32B 15/013* (2013.01); *C21D 9/46* (2013.01); *C22C 18/00* (2013.01); *C22C 18/04* (2013.01); *C22C 21/02* (2013.01); *C22C 21/10* (2013.01); *C22C 38/00* (2013.01); *C22C 38/001* (2013.01); *C22C 38/40* (2013.01); *C22C 38/44* (2013.01); *C22C 38/58* (2013.01); *C23C 2/06* (2013.01); *C23C 2/28* (2013.01); *C23C 2/40* (2013.01)

(58) Field of Classification Search
CPC ....................................................... C23C 2/02
See application file for complete search history.

(56) References Cited

U.S. PATENT DOCUMENTS

| | | | |
|---|---|---|---|
| 4,675,214 A | 6/1987 | Kilbane et al. | |
| 4,883,723 A | 11/1989 | Kilbane et al. | |
| 5,023,113 A | 6/1991 | Boston et al. | |
| 5,066,549 A | 11/1991 | Kilbane et al. | |
| 5,246,563 A | 9/1993 | Maresch et al. | |
| 5,591,531 A | 1/1997 | Jasper | |
| 7,736,449 B2 | 6/2010 | Takada et al. | |
| 8,481,172 B2 | 7/2013 | Warnecke et al. | |
| 8,652,275 B2 | 2/2014 | Leuschner et al. | |
| 2004/0033386 A1 | 2/2004 | Pradhan et al. | |
| 2009/0123651 A1* | 5/2009 | Okada ........................ | C23C 2/28 427/319 |

FOREIGN PATENT DOCUMENTS

| | | |
|---|---|---|
| AT | 392089 B | 1/1991 |
| EP | 0467749 B1 | 10/1994 |
| EP | 1612288 A1 | 1/2006 |
| EP | 1693477 A1 | 8/2006 |
| EP | 1857566 A1 | 11/2007 |
| EP | 1936000 A1 | 6/2008 |
| EP | 2009128 A1 | 12/2008 |
| EP | 2055799 A1 | 5/2009 |
| EP | 2177641 A1 | 4/2010 |
| EP | 2184376 A1 | 5/2010 |
| JP | 60262950 A | 12/1985 |

(Continued)

OTHER PUBLICATIONS

Chandler, Harry. (1995). Heat Treater's Guide—Practices and Procedures for Irons and Steels (2nd Edition)—1. Heat Treating Processes and Related Technology. ASM International.*

(Continued)

*Primary Examiner* — Roy King
*Assistant Examiner* — Jophy S Koshy
(74) *Attorney, Agent, or Firm* — The Webb Law Firm

(57) ABSTRACT

A method which allows process-stable hot-dip coating of Ni-alloy steel flat products in a cost- and resource-effective manner, including the following steps: a) provision of a steel flat product obtained by cold- or hot-rolling; b) within 1-30 s, heating the steel flat product to a holding temperature between 700 and 1100° C., under a heating atmosphere of N2; c) holding the steel flat product at the holding temperature for a holding duration of 10-120 s under a holding atmosphere of N2; d) cooling the steel flat product from the holding temperature to a strip inlet temperature of 430-800° C.; and e) passing the steel flat product through an inlet zone, in which an inert or reducing inlet atmosphere predominates, and passing the steel flat product through a melt bath, wherein TP1>TP2>TP4.

13 Claims, 1 Drawing Sheet

(56) References Cited

FOREIGN PATENT DOCUMENTS

| JP | 61147865 A | 7/1986 |
|----|------------|--------|
| JP | 2285057 A | 11/1990 |
| JP | 3111546 A | 5/1991 |
| JP | 5311380 A | 11/1993 |
| JP | 2003253413 A | 9/2003 |
| JP | 2008523243 A | 7/2008 |
| WO | 0050658 A1 | 8/2000 |
| WO | 2005017214 A1 | 2/2005 |
| WO | 2012028465 A1 | 3/2012 |

OTHER PUBLICATIONS

English machine translation of JP 02285057 A of Nakamori, Toshio et al. published Nov. 22, 1990.*

* cited by examiner

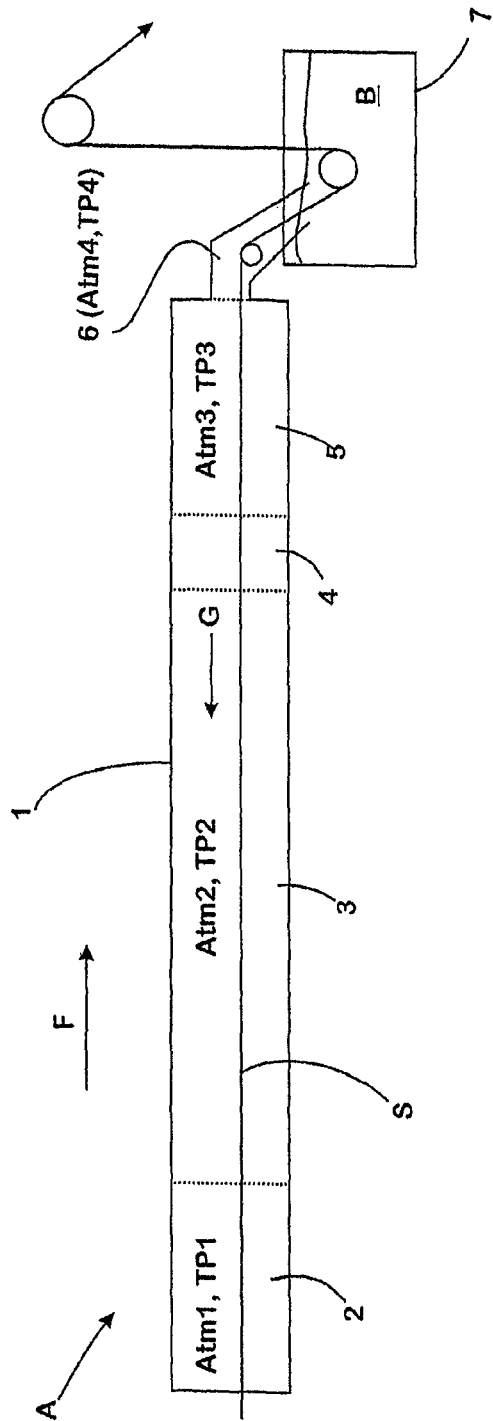

METHOD FOR HOT-DIP COATING OF A STEEL FLAT PRODUCT

CROSS-REFERENCE TO RELATED APPLICATIONS

This application is the United States national phase of International Application No. PCT/EP2012/075402 filed Dec. 13, 2012, and claims priority to German Patent Application No. 10 2012 101 018.8 filed Feb. 8, 2012, the disclosures of which are hereby incorporated in their entirety by reference.

BACKGROUND OF THE INVENTION

Field of the Invention

The invention concerns a method for hot-dip coating of a steel flat product with a metallic protective coating, wherein the steel from which the steel flat product is made contains at least 2.0 wt. % Ni and at least 5.0 wt. % Cr.

The term "steel flat products" used here refers to strips or sheet steels, and the plates and blanks produced therefrom.

Description of Related Art

In the same way for example as Mn or N, Ni stabilises the austenitic structure state in steels at lower temperatures. This effect can be deliberately used to improve the mechanical material properties of the steel. Multiphase steels with residual austenite proportions have a particularly good combination of strength and ductility. Fully austenitic steel qualities with Ni content >8 wt. % furthermore have no brittle-ductile transition, which allows low-temperature applications. In comparison with high Mn-alloy steel qualities, Ni-alloy full austenites are furthermore substantially less susceptible to environmental loads. In particular, Ni steels with an additional Cr-alloy proportion are characterised by particularly good chemical resistance and high corrosion resistance. The presence of Mo in the respective steel further supports this passivation. Further elements such as Al, Mn, Ti and Si may be added, depending on the desired material strength or ductility of the respective steel alloy.

Because of its particular material properties, there is great potential for use of Ni-alloy steel flat products in the region of high- and low-temperature applications. These include amongst others vehicle construction, in particular the structural components in the suspension area, chemical equipment construction, plant and machinery construction. Furthermore for example decorative elements for housebuilding or similar can be produced using Ni-alloy steel.

Despite its significant resistance to environmental influences, when using steel flat products produced from nickel-alloy steels of the type described here for particularly stressed components or parts, it may be technically necessary or economic to apply an additional protective coating. This not only optimises the resistance, in particular the corrosion resistance, but also improves the forming suitability or aesthetic appearance of the respective steel flat product.

Continuous strip coating constitutes a generally established method of applying such a metallic protective coating to a steel flat product. However the chemical passivity of external oxides of the alloy elements, which adhere to the respective surface of the product to be coated, causes a deterioration in the coating result. Critical alloy constituents in this respect are for example Cr, Al, Mn, Si and other oxide-forming elements. The oxides formed from these alloy elements on the surface of the steel flat product to be coated cause wetting and adhesion defects. To avoid these defects, particular requirements must be fulfilled by the method and plant available for continuous strip coating.

AT 392 089 B describes a method of electrolytic galvanisation of stainless steels on one and both sides in the continuous strip process. This method is however comparatively costly and is therefore not widely used in practice.

A more economic alternative to electrolytic coating is continuous hot-dip coating of strip steels. In this method, after undergoing recrystallisation annealing in a passage furnace, a steel strip is briefly immersed in a metallic melt bath which is typically based on zinc, aluminium or their alloys.

The hot-dip coating of alloy steels requires particular care since during the annealing phase, in these steels, oxygen-affine alloy constituents can oxidise selectively on the steel surface. If the selective oxidisation takes place externally, wetting defects and adhesion faults must be expected.

To avoid these problems, steel flat products which are to be given a protective metal coating by hot-dip coating must normally have their alloy content limited to specific maximum values. This includes the Ni content of the respective steel substrate. The Ni content of steel flat products to be given a metallic protective coating by hot-dip coating is usually limited in practice to less than 2.0 wt. %, in particular up to 1.0 wt. %. Examples of this are given in EP 2 009 128 A1, EP 1 612 288 A1 and EP 2 177 641 A1.

A different special case is the hot-dip coating of nickel-alloy steels which, as well as Ni, also contain Cr in contents of 5-30 wt. %. For such Cr-alloy steel qualities, attempts have been made for example to suppress the external oxide formation by heat treatment with strongly reductive annealing parameters (so-called bright annealing). Methods based on this concept are described in U.S. Pat. Nos. 4,675,214, 5,066,549, 4,883,723, 5,023,113 and EP 0 467 749 B1.

As an alternative to these known methods, JP 3 111 546 A and JP 5 311 380 A each propose forming a targeted FeO layer (pre-oxidisation) during heating, and reducing this layer to metallic iron (Fe) during a subsequent holding phase.

Furthermore in the method known from U.S. Pat. No. 5,591,531, an Fe-rich edge zone of the steel flat product to be coated is preconditioned by means of hood annealing in an off-line working step. Then the steel flat product is introduced into a hot-dip coating plant and coated.

Another possibility cited in EP 2 184 376 A1 is an off-line pre-coating in which a thin Fe layer is applied to the surface of the steel strip ("Fe flash").

The methods outlined above for hot-dip coating of Cr-alloy steels require the hot-dip coating to be carried out as a thermal aluminisation, but do not usually cover the application of a zinc-based protective coating. The practical use of the methods explained above for hot-dip coating of Ni-/Cr-alloy steels in practical operation is hindered by the problem that they can only be carried out at great expense on a conventionally designed hot-dip coating plant which is designed for conventional alloy steels. In addition there are high consumption and maintenance costs, which are caused by the high $H_2$ consumption associated with the use of the known methods and the high annealing temperatures required for these methods. The high consumption and operating costs do not harmonise with today's demand for economic and ecological compatibility of such methods. In particular, operational trials show that pre-oxidisation in the manner of the procedures described in JP 3-111546 A and JP 5-311380A is difficult to manage in practice, and offers low process reliability. Both in the case that too thick an oxide layer is formed during oxidisation, and if the layer thickness is too low, direct wetting defects can occur which cause poor adhesion of the hot-dip coating to the respective steel substrate.

In principle, the known proposals outlined above for hot-dip coating of Cr-alloy steels relate only to ferritic special steels. The Ni content of the steel alloys concerned—where there is any Ni content at all—is consequently limited to a comparatively low upper limit of <3.0 wt. %. It is known from the prior art that the presence of Ni can be extremely advantageous in a steel flat product to be coated with hot-dip coating. A precoating of the steel strip surface with a thin Ni layer applied before insertion of the strip steel in the hot-dip coating plant ("Ni flash") effectively suppresses the selective oxidisation of oxygen-affine alloy elements of the steel flat product and persistently improves the coating result. The use of an Ni flash for hot-dip coating is recommended e.g. in JP 61-147865 A or JP 60-262950 A. Since the application of an Ni flash however requires an additional working step, which entails substantial additional costs, this procedure has not become common in practice.

As well as the separate application of an Ni flash, the Ni content of the steel alloy itself can be used to improve the quality of a metallic hot-dip coating. According to U.S. Pat. No. 7,736,449 B2, an Ni content of up to 2.0 wt. % Ni is added as an alloy to the steel of the steel flat products to be coated in order to inhibit the occurrence of Mn, Al and Si oxides on the surface of the steel flat product. The respective Ni proportion to be added is defined by various complex, formulaic correlations both with the contents of the other alloy elements of the steel flat product and with the annealing parameters which must be observed during recrystallisation. A similar approach is followed in WO 00/50658 A1 for thermal galvanisation of the steel flat product with 0.2-5.0 wt. % Ni. In this method too, an edge layer is produced on the surface of the strip steel, in which the Ni content is set as a function of the respective Al and Si content. The dependencies to be taken into account in process management mean that this method cannot be implemented on a large industrial scale with the necessary operational reliability and reproducibility. In this context, it was an object of the invention to specify a method which allows the hot-dip coating of Ni-alloy steel flat products in a cost- and resource-effective manner, and which can be used process-reliably in industrial practice.

SUMMARY OF THE INVENTION

The method according to the invention is suitable for the hot-dip coating of cold- or hot-rolled steel flat products which are annealed in a large industrial thermal coating plant under controlled atmospheric conditions in continuous operation, and then immediately hot-dip coated in-line. The procedure according to the invention requires no flash precoating or similar.

For this, the method according to the invention in principle comprises the following process steps which are carried out successively in-line:
a) provision of a steel flat product,
b) heating of the steel flat product to a holding temperature,
c) holding and recrystallisation of the steel flat product at the holding temperature,
d) cooling of the steel flat product to a strip inlet temperature, and
e) passage of the steel flat product through an inlet zone into a melt bath.

The list of the process steps a) to e) to be carried out at least successively in continuous passage as part of the method according to the invention is not definitive. Thus between process steps a) and b) there may in some cases be a working step a') of cleaning the surface of the steel flat products to be coated. Furthermore between the cooling to the respective strip inlet temperature (process step d)) and the entry into the respective melt bath (process step e)), there may also be an optional process step d') of overageing treatment. Similarly, normally after emergence of the steel flat product from the melt bath, as a process step e') there may be an adjustment of the thickness of the metal protective coating then present on the steel flat product.

In concrete terms, the method according to the invention for hot-dip coating of a steel flat product containing a high Ni and Cr content with a metallic protective coating provides at least the following working steps:
a) provision of a steel flat product obtained by cold- or hot-rolling which is produced from a steel containing at least 2.0 wt. % Ni and at least 5.0 wt. % Cr;
b) within 1-30 s, heating of the steel flat product to a holding temperature between 700 and 1100° C., wherein heating takes place under a heating atmosphere which has a dew point TP1 set to −15° C. to +30° C. and which contains, as well as $N_2$ and technically unavoidable contaminants, optionally one or more of the following constituents (in vol. %): $H_2$: 1-50%, CO: 0.1-2.0%, $CO_2$: 5.0-15.0%;
c) holding of the heated steel flat product at the holding temperature for a holding duration of 10-120 s under a holding atmosphere which consists of $N_2$ and technically unavoidable contaminants and 1.0-50.0 vol. % $H_2$ and up to 1.0 vol. % $O_2$, and the dew point TP2 of which is set to −30° C. to 0° C.;
d) cooling of the steel flat product from the holding temperature to a strip inlet temperature amounting to 430-800° C.;
e) passage of the steel flat product through an inlet zone, in which the steel flat product is held under an inert or reducing inlet atmosphere until entry into the melt bath, and subsequent passage through a melt bath in which the steel flat product is hot-dip coated with the metallic coating;

wherein the dew point TP1 of the heating atmosphere is higher than the dew point TP2 of the holding atmosphere, and the dew point TP2 is higher than the dew point TP4 of the inlet atmosphere. In other words: TP1>TP2>TP4.

After emergence from the melt bath and an optional adjustment of the thickness, for example by the use of scraper nozzles, of the metallic coating present on the steel flat product emerging from the melt bath, the resulting steel flat product can be cooled in the conventional manner to room temperature. The cooling can be followed optionally by preforming (temper pass rolling), passivation, oiling and winding of the steel flat product into a coil. If necessary, before or after coiling, further heat treatment can be carried out in order to give certain properties to the metallic coating.

The individual process steps performed successively in a continuous process in the method according to the invention are preferably carried out in a known passage furnace in which each process step is associated with a specific furnace zone.

The steel flat product to be produced can be present as a roll-hardened or annealed cold or hot strip. The use of the method according to the invention has proved particularly economic in particular when roll-hardened, cold-rolled steel flat products are used as the starting material. In particular if such a cold-rolled, roll-hardened steel flat product is to be processed, it has proved advantageous if the holding temperature reached during heating in working step a) amounts to 700-1100° C., in particular 700-850° C., in order to achieve recrystallisation during holding.

The method according to the invention can be operated in an optimally economic manner if the $H_2$ content of the heating atmosphere is 1.0-5.0 vol. %.

The invention is based on the concept that heat treatment before entry into the melting bath, in which the metallic protective layer is applied to the steel flat product, is carried out so that an externally migrating, so-called "external" oxidisation, which becomes perceptible by oxide formation on the surface of the steel flat product, is largely fully suppressed. Optimally therefore all heat treatment steps of the method according to the invention are carried out under a reducing atmosphere in indirectly fired furnaces, so that in any case a minimised, or optimally no external oxidisation occurs.

For indirect heating of the steel flat product, furnaces conventional in practice of the RTF type (RTF=Radiant Tube Furnace) are used. In this furnace type, heating takes place in that the combustion gases are conducted through radiant tubes arranged in the furnace chamber. Combustion takes place inside the radiant tubes. In this way the combustion gases are separated from the furnace atmosphere. In this case the addition of oxidising atmospheric constituents can be avoided, so that in a targeted manner, a heating atmosphere can be maintained which consists exclusively—apart from technically unavoidable contaminants—of $N_2$ and an optional $H_2$ proportion deliberately added.

If therefore—for example because of the plant technology available—the steel flat product is heated in working step a) in a directly heated furnace zone, in this case the heating atmosphere is set such that it contains, as well as $N_2$ and the optionally present $H_2$, a maximum of 0.1-2.0 vol. % CO and maximum 5.0-15.0 vol. % $CO_2$. In this way the heating atmosphere in a directly fired heating zone is set such that external oxidisation of iron or base metal elements is avoided and the oxide formation of the base metal elements takes place almost exclusively internally.

An essential advantage of the method according to the invention is therefore that there is no need for targeted pre-oxidisation, as described in some of the known methods. In this way the control and regulation costs associated with performance of the method according to the invention are substantially reduced.

During the holding phase following the heating (process step b)), the steel flat product heated according to the invention is annealed at the holding temperature for 10-120 s. The holding atmosphere predominating in the holding zone, the holding duration, the holding temperature and the dew point TP2 of the holding atmosphere, are matched to each other such that at the end of the holding phase, the structure of the steel flat product is recrystallised and any external oxides of all types which may be present are reduced, and the new formation of such oxides is avoided. Optimum working results are achieved if also the $H_2$ content of the holding atmosphere is 1.0-5.0 vol. %. To minimise the oxidisation potential of the holding atmosphere further, at the same time the $O_2$ content of the holding atmosphere can be limited to maximum 0.1 vol. %.

In concrete terms, the dew point TP2 of the holding atmosphere is set such that external oxidisation of the steel flat products is avoided during holding at the holding temperature. For this according to the invention, the dew point TP2 is set to minimum −30° C., in particular higher than −30° C. With lower dew points, there is a risk that base metal alloy elements, such as e.g. Cr, Mn or Si, will form external oxides. At the same time, the dew point TP2 according to the invention should be maximum 0° C. in order to achieve a sufficient reduction potential in relation to any iron or nickel oxides present on the surface of the steel flat product, or to avoid their occurrence. The undesirable occurrence of Fe or Ni oxides on the surface of the steel flat product according to the invention can be achieved particularly reliably if the dew point TP2 of the holding zone atmosphere is set less than or equal to −10° C.

After holding, the temperature of the steel strip is cooled inside a cooling zone from the holding temperature to a strip inlet temperature at which the strip steel product enters the respective melt bath and which lies in the region of 430-800° C. The strip inlet temperature selected in each case, like the temperature of the melt bath through which the steel flat product is conducted for application of the metal protective layer, depends on whether the coating is composed on a zinc or aluminium base.

Table 1 shows typical ranges for the strip inlet temperature with which the steel flat product enters the respective melt bath for coatings based on Zn (e.g. Zn, ZnAl, ZnMg or ZnMGAl coatings) and Al (e.g. AlZn, AlSi coatings), and the appropriate temperature range of the respective melt bath.

TABLE 1

| Melt bath | Strip immersion temperature | Melt bath temperature |
|---|---|---|
| Zn basis | 430-650° C. | 420-600° C. |
| Al basis | 650-800° C. | 650-780° C. |

As an option, following cooling to the strip inlet temperature (process step d)), the steel flat product can undergo overageing treatment in a process step d'), wherein the steel flat product is held for 1-30 s at the strip inlet temperature under an overageing atmosphere, wherein the overageing atmosphere contains, as well as $N_2$ and technically unavoidable contaminants, optionally 1-50 vol. % $H_2$, in particular 1-5 vol. % $H_2$, and wherein the dew point TP3 of the overageing atmosphere is set to −50° C. to −25° C.

After cooling and optional overageing treatment, the steel flat product is conducted into the melt bath provided in a melt bath boiler. In order to avoid any contact with the surrounding atmosphere, the heat-treated steel flat product according to the invention is conducted into the melt bath at strip inlet temperature through an inlet construction extending into the melt bath boiler. An inert or reducing inlet atmosphere predominates in this inlet zone. The inlet atmosphere can consist of $N_2$ and technically unavoidable contaminants and optionally 1.0-50.0 vol. % $H_2$, wherein the dew point TP4 of the inlet atmosphere composed in this way is −80° C. to −25° C.

In general it can be stated that the steel flat product is cooled according to the invention to the respective strip inlet temperature under an inert or reducing atmosphere. In concrete terms, the cooling is carried out in each case under the atmosphere predominating in the working step following the cooling. In the case that no overageing treatment is carried out, i.e. the steel flat product enters the inlet zone immediately after cooling and from there passes into the melt bath, this is the inlet atmosphere. In contrast, in the case that the steel flat product is subject to overageing treatment after cooling, cooling takes place under the overageing atmosphere.

The steel flat product prepared in the manner according to the invention then passes through the melt bath, filled in the known manner in a suitable melt bath boiler, in continuous passage, whereby in practice an immersion duration of 1-10 s, in particular 2-5 s, has proved suitable. In the melt bath boiler, the melt bath wets the steel surface and a chemical reaction takes place between the metallic iron of the strip steel and the melt bath to form an intermetallic boundary layer, which guarantees a good coating adhesion.

A melt bath which is particularly suitable for coating a steel flat product of the type processed according to the invention can comprise (all data in wt. %), as well as Zn and unavoidable contaminants, 0.1-60.0%, in particular 0.15-0.25% Al, and up to 0.5% Fe. Depending on the respective content of Al, the coatings produced in the melt bath composed in this way are in practice known as "Z", "ZA" or "AZ" coatings. The unavoidable contaminants here include traces of Si, Mn, Pb and rare earths. Another melt bath composition contains, as well as Zn and unavoidable contaminants, 0.05-8.0% Al, 0.2-8.0% Mg, up to 2.0% Si, up to 0.1% Pb, up to 0.2% Ti, up to 1% Ni, up to 1% Cu, up to 0.3% Co, up to 0.5% Mg, up to 0.2% Cr, up to 0.5% Sr, up to 3.0% Fe, up to 0.1% B, up to 0.1% Bi, up to 0.1% Cd and traces of rare earths and unavoidable contaminants, wherein for the ratio of the Al content % Al to the Mg content % Mg, % Al/% Mg<1. Other compositions of a melt bath suitable for coating steel flat products of the type described here are disclosed for example in EP 1 857 566 A1, EP 2 055 799 A1 and EP 1 693 477 A1. Magnesium-containing, zinc-based coatings of this type are in practice are known as "ZM" coatings.

If the hot-dip coated steel flat product is then thermally treated in-line to produce an Fe—Zn alloy coating (galvannealing), a melt bath composition has proved suitable which contains, as well as Zn and unavoidable contaminants, 0.1-0.15 wt. % Al and up to 0.5% Fe. The coating produced in such a melt bath is designated in the trade by the prefix "ZF".

An Al-based coating free from Zn—apart from unavoidable traces—typically contains, as well as Al and unavoidable contaminants, up to 15.0 wt. % Si and up to 5.0% Fe. Coatings of this type are known in practice as "AS coatings".

By setting of the dew points TP1, TP2 and TP4 according to $$TP1>TP2>TP4$$

or in the case that a overageing treatment is carried out, according to $$TP1>TP2>TP3\geq TP4$$

the oxidisation potential of the respective heating atmosphere (dew point TP1), the holding atmosphere (dew point TP2), the optionally present overageing atmosphere (dew point TP3) and the inlet atmosphere (dew point TP4) is in each case optimally adapted to the steel strip temperature present during the respective process step. The high dew point TP1 of the heating atmosphere maintained during heating causes an increased initial formation of internal oxides of base metal alloy elements. In the subsequent holding at the high holding temperature, by lowering the dew point TP2, the oxidisation potential of the holding atmosphere is lowered in order to achieve an optimum reduction result on the steel surface and prevent the oxidisation of Fe and Ni.

The further lowering of the dew point TP3 of the atmosphere maintained during the optionally performed overageing treatment causes a further reduction in the oxidisation potential. This takes into account the circumstance that, because of the low strip temperature predominating in the overageing treatment and the short duration thereof, any external oxides which may have newly formed before this can no longer be reduced in the overageing step itself or in the subsequent working steps. For the same reason, the dew point TP4 of the inlet atmosphere predominating in the inlet is set lower than or equal to the dew point TP3 of the overageing atmosphere, and hence lower than the dew point TP2 of the holding atmosphere.

In order to observe the condition $TP1>TP2>TP3\geq TP4$, in practical implementation, all contamination of the drier atmosphere by the atmosphere maintained in the preceding working step must be avoided. This can be achieved easily if a pressure drop of 20 to 100 Pa is set and maintained over the length of the passage furnace used, against the strip advance direction. This results in a gas flow which is permanently directed against the advance direction of the steel flat product through the passage furnace, and which in each case mixes a drier atmosphere with the atmosphere maintained during the preceding process step.

The gas flow concerned, directed against the advance direction of the steel flat product through the passage furnace, can for example be regulated by control of the gas volume flow supplied, the flow speed and the pressure drop. The flow speed and pressure drop can be manipulated in that the suction power of the gas extractor, which typically is positioned at the start of the furnace, is adapted to the respective requirements. Locally the flow speed can be further increased for example by fitting constrictions in the furnace interior.

The control and setting of the dew points TP1-TP4 important for the method according to the invention may, in particular on control of dew points TP1 and TP2, require a targeted moistening of the heating atmosphere and holding atmosphere. For this a damp medium can be introduced into the respective atmosphere (heating atmosphere, holding atmosphere, inlet atmosphere or overageing atmosphere). This is generally achieved by the addition of an oxidative medium which may be steam, moist $N_2$ or $H_2$, a moistened mix of $N_2$ and $H_2$ or of $N_2$ and $O_2$, or $O_2$. This is normally added via one supply line per furnace zone be moistened, which is separated from the inert gas supply for ease of regulation.

A hot-dip coated steel flat product according to the invention, because of its mechanical values and surface properties, is ideally suited for a single or multistage cold- or hot-forming into a sheet metal component. Thus in particular components for automotive vehicle structures, and for high and low temperature applications in equipment, machine or domestic appliance construction, can be produced from the steel flat products obtained according to the invention. Steel flat products produced according to the invention have a good forming capacity and a high resistance to thermal and corrosive environmental loads. The use of a hot-dip coated steel flat product according to the invention therefore not only allows optimum utilisation of lightweight construction potential, but also extends the life of the product formed from the steel flat product produced according to the invention.

A steel from which the steel flat product processed according to the invention is produced, typically contains as well as iron and unavoidable contaminants (in wt. %): Cr 5.0-30.0%, Ni 2.0-30.0%, Mn≤6.0%, Mo≤5.0%, Si≤2.0%, Cu≤2.0%, Ti≤1.0%, Nb≤1.0%, V≤0.5%, N≤0.2%, Al≤2.0%, C≤0.5%.

BRIEF DESCRIPTION OF THE DRAWINGS

The invention is explained below in more detail with reference to exemplary embodiments.

FIG. 1 shows diagrammatically a hot-dip coating plant A comprising a passage furnace 1 which has furnace zones 2, 3, 4, 5, 6 adapted to perform the method according to the invention.

DESCRIPTION OF THE INVENTION

The sheet steel product S to be hot-dip coated passes in succession through furnace zones 2-6 in the advance direction F, without interruption. The steel flat product S first enters furnace zone 2 in which it is heated within a heating duration of 20 seconds to a holding temperature T1 under a heating atmosphere Atm1.

Then after furnace zone 2, the steel flat product S passes through furnace zone 3 in which it is held at the holding temperature T1 for a duration of 45 s under a holding atmosphere Atm2.

Furnace zone 3 is followed by furnace zone 4, in which the steel flat product S is cooled to the strip inlet temperature T2 within 10 seconds. The cooling is carried out under the overageing atmosphere Atm3 which predominates in the furnace zone 5 following furnace zone 4.

In furnace zone 5, the steel flat product S is subjected to overageing treatment for a duration of 20 s under an overageing atmosphere Atm3 at the strip inlet temperature T2.

After furnace zone 5, the steel flat product S enters the furnace zone 6, formed as an inlet which opens with its free end into a melt bath B which is filled in a melt bath boiler 7. In furnace zone 6, the steel flat product S is held under an inlet atmosphere Atm4 at the strip inlet temperature T2.

The steel flat product conducted via the furnace zone 6 into the melt bath B is there diverted in the known manner over a reversing roller sitting in the melt bath B, and then passes through a scraper device (not shown here) with which the thickness of the metal coating present on the steel flat product S emerging from the melt bath B is adjusted, and finally, in a manner known in itself, is guided via a cooling section to a winding device (also not shown here) at which it is wound into a coil.

The steel flat product S given the metallic protective coating in the hot-dip coating plant A is typically a cold-rolled steel strip in roll-hardened state.

For 18 experiments V1-V18 from three different steels S1-S3, the alloy constituents of which are given in table 2 in wt. %, cold-rolled strip steels were produced which were then fed in roll-hardened state into the hot-dip coating plant A.

TABLE 2

| Steel | C | Ni | Cr | Mn | Mo | N |
|---|---|---|---|---|---|---|
| S1 | 0.03 | 13.0 | 18.5 | 2.0 | 2.5 | — |
| S2 | 0.15 | 9.5 | 19.0 | 2.0 | 0.8 | 0.11 |
| S3 | 0.07 | 10.5 | 17.0 | 2.0 | — | — |

Remainder Fe and unavoidable contaminants

Table 3 shows, for each of the experiments V1-V18, the holding temperature T1 reached in the furnace zone 2, the composition of the heating atmosphere Atm1 predominating in furnace zone 2, the dew point TP1 of the heating atmosphere Atm1 set, the composition of the holding atmosphere Atm2 predominating in the furnace zone 3, the respective dew point TP2 of the holding atmosphere Atm2, the strip inlet temperature reached after cooling in furnace zone 4, the composition of the overageing atmosphere Atm3 predominating in the furnace zone 5, the dew point TP3 of the overageing atmosphere Atm3, the composition of the inlet atmosphere Atm4 predominating in the furnace zone 6 formed as an inlet, the dew point TP4 of the inlet atmosphere Atm4, the temperature T3 of the melt bath B and the composition of the melt bath B.

By setting a pressure drop between the atmospheres Atm3-Atm4 predominating in the furnace zones 2-6, in the passage furnace 1 a gas flow G flowing against the advance direction F is maintained, which prevents a contamination of the respectively drier atmosphere Atm2, Atm3, Atm4 by the damper atmosphere Atm1, Atm2, Atm3 previously passed by the steel flat product S.

Table 4 evaluates the results of the experiments V1-V18. It is clear that the exemplary embodiments 4, 5, 6, 11, 12 which do not conform to the invention, in which the dew points TP1, TP2, TP3, TP4 set do not follow the definition according to the invention TP1>TP2>TP3≥TP4, and where applicable showed further deviations from the requirements of the invention, and the exemplary embodiments 15 and 17 in which one of the dew points TP1 and TP2 lay outside the range predefined according to the invention, gave only unsatisfactory coating results. In contrast, the experiments carried out in the manner according to the invention each gave optimum coating results.

TABLE 3

| Experiment | Steel | T1 [° C.] | Atm1 [vol.-%] | TP1 [° C.] | Atm2 [vol.-%] | TP2 [° C.] | T2 [° C.] | Atm3 [vol.-%] |
|---|---|---|---|---|---|---|---|---|
| 1 | S1 | 780 | $N_2$ + 5% $H_2$ | 0 | $N_2$ + 5% $H_2$ | −20 | 485 | $N_2$ + 5% $H_2$ |
| 2 | S1 | 750 | $N_2$ + 5% $H_2$ | +20 | $N_2$ + 5% $H_2$ | −20 | 485 | $N_2$ + 5% $H_2$ |
| 3 | S1 | 800 | $N_2$ + 5% $H_2$ | −10 | $N_2$ + 5% $H_2$ | −20 | 480 | $N_2$ + 5% $H_2$ |
| 4 | S1 | 650 | $N_2$ + 5% $H_2$ | −10 | $N_2$ + 5% $H_2$ | −30 | 485 | $N_2$ + 5% $H_2$ |
| 5 | S1 | 800 | $N_2$ + 5% $H_2$ | −20 *) | $N_2$ + 5% $H_2$ | −20 | 485 | $N_2$ + 5% $H_2$ |
| 6 | S1 | 800 | $N_2$ + 5% $H_2$ | −30 *) | $N_2$ + 5% $H_2$ | −30 | 490 | $N_2$ + 5% $H_2$ |
| 7 | S2 | 780 | $N_2$ + 5% $H_2$ | 0 | $N_2$ + 5% $H_2$ | −20 | 490 | $N_2$ + 5% $H_2$ |
| 8 | S2 | 750 | $N_2$ + 5% $H_2$ | 0 | $N_2$ + 5% $H_2$ | −20 | 490 | $N_2$ + 5% $H_2$ |
| 9 | S2 | 800 | $N_2$ + 5% $H_2$ | +5 | $N_2$ + 5% $H_2$ | −20 | 485 | $N_2$ + 5% $H_2$ |
| 10 | S2 | 850 | $N_2$ + 5% $H_2$ | +10 | $N_2$ + 5% $H_2$ | −25 | 485 | $N_2$ + 5% $H_2$ |
| 11 | S2 | 800 | $N_2$ + 5% $H_2$ | −20 *) | $N_2$ + 5% $H_2$ | −30 | 485 | $N_2$ + 5% $H_2$ |
| 12 | S1 | 800 | $N_2$ + 5% $H_2$ | −30 *) | $N_2$ + 5% $H_2$ | −30 | 485 | $N_2$ + 5% $H_2$ |
| 13 | S3 | 780 | $N_2$ + 5% $H_2$ | +10 | $N_2$ + 5% $H_2$ | −20 | 480 | $N_2$ + 5% $H_2$ |
| 14 | S3 | 750 | $N_2$ + 5% $H_2$ | 0 | $N_2$ + 5% $H_2$ | −20 | 690 | $N_2$ + 5% $H_2$ |
| 15 | S3 | 800 | $N_2$ + 5% $H_2$ | −10 | $N_2$ + 5% $H_2$ | −45 *) | 485 | $N_2$ + 5% $H_2$ |
| 16 | S3 | 850 | $N_2$ + 5% $H_2$ | −10 | $N_2$ + 5% $H_2$ | −30 | 680 | $N_2$ + 5% $H_2$ |

TABLE 3-continued

| | | | | | | | |
|---|---|---|---|---|---|---|---|
| 17 | S3 | 800 | N$_2$ + 5% H$_2$ | −20 *) | N$_2$ + 5% H$_2$ | −30 | 485 N$_2$ + 5% H$_2$ |
| 18 | S3 | 800 | N$_2$ + 5% H$_2$ | −30 *) | N$_2$ + 5% H$_2$ | −30 | 485 N$_2$ + 5% H$_2$ |

| Experiment | TP3 [° C.] | Atm4 [vol.-%] | TP4 [° C.] | T3 [° C.] | Composition of the melt bath B [wt.-%] |
|---|---|---|---|---|---|
| 1 | −30 | N$_2$ + 5% H$_2$ | −40 | 465 | Zn + 0.18% Al |
| 2 | −30 | N$_2$ + 5% H$_2$ | −50 | 465 | Zn + 0.18% Al |
| 3 | −30 | N$_2$ + 5% H$_2$ | −50 | 470 | Zn + 0.12% Al |
| 4 | −30 | N$_2$ + 5% H$_2$ | −30 | 465 | Zn + 0.18% Al |
| 5 | −20 | N$_2$ + 5% H$_2$ | −20 | 465 | Zn + 0.18% Al |
| 6 | −30 | N$_2$ + 5% H$_2$ | −30 | 470 | Zn + 0.18% Al |
| 7 | −30 | N$_2$ + 5% H$_2$ | −40 | 460 | Zn + 0.18% Al |
| 8 | −30 | N$_2$ + 5% H$_2$ | −50 | 460 | Zn + 0.18% Al |
| 9 | −30 | N$_2$ + 5% H$_2$ | −50 | 460 | Zn + 0.22% Al |
| 10 | −30 | N$_2$ + 5% H$_2$ | −30 | 470 | Zn + 0.18% Al |
| 11 | −20 | N$_2$ + 5% H$_2$ | −20 | 465 | Zn + 0.18% Al |
| 12 | −30 | N$_2$ + 5% H$_2$ | −30 | 465 | Zn + 0.18% Al |
| 13 | −30 | N$_2$ + 5% H$_2$ | −40 | 465 | Zn + 0.9% Al + 0.9% Mg |
| 14 | −30 | N$_2$ + 5% H$_2$ | −50 | 680 | Al + 11.5% Si |
| 15 | −50 | N$_2$ + 5% H$_2$ | −50 | 465 | Zn + 0.18% Al |
| 16 | −35 | N$_2$ + 5% H$_2$ | −50 | 670 | Al + 11.5% Si |
| 17 | −40 | N$_2$ + 5% H$_2$ | −50 | 470 | Zn + 0.18% Al |
| 18 | −20 *) | N$_2$ + 5% H$_2$ | −20 *) | 470 | Zn + 0.18% Al |

*) outside definitions according to the invention

TABLE 4

| Experiment | Result | According to the invention |
|---|---|---|
| 1 | good | yes |
| 2 | good | yes |
| 3 | good | yes |
| 4 | wetting defects | no |
| 5 | wetting defects | no |
| 6 | wetting defects | no |
| 7 | good | yes |
| 8 | good | yes |
| 9 | good | yes |
| 10 | good | yes |
| 11 | wetting defects | no |
| 12 | wetting defects | no |
| 13 | good | yes |
| 14 | good | yes |
| 15 | wetting defects poor adhesion | no |
| 16 | good | yes |
| 17 | wetting defects | no |
| 18 | wetting defects | no |

The invention claimed is:

1. A method for hot-dip coating of a steel flat product with a metallic protective coating, comprising:
 a) providing a steel flat product obtained by cold- or hot-rolling, which is produced from a steel containing at least 2.0 wt. % Ni and at least 5.0 wt. % Cr;
 b) heating of the steel flat product, for a period of 1-30 s, to a holding temperature between 700 and 1100° C., wherein the heating takes place under a heating atmosphere, wherein a dew point of the heating atmosphere is −15° C. to +30° C. and the heating atmosphere contains N$_2$ and unavoidable contaminants, and optionally one or more of the following constituents by volume:
 H$_2$: 1-50%,
 CO: 0.1-2.0%,
 CO$_2$: 5.0-15.0%;
 c) holding the heated steel flat product at the holding temperature for a holding duration of 10-120 s under a holding atmosphere which consists of N$_2$ and unavoidable contaminants, 1.0-50.0 vol. % H$_2$ and up to 1.0 vol. % O$_2$, and wherein a dew point of the holding atmosphere is −30° C. to 0° C.;
 d) cooling the steel flat product from the holding temperature to a strip inlet temperature of 430-800° C.;
 e) passing the steel flat product through an inlet zone, in which the steel flat product is held under an inert or reducing inlet atmosphere until entry into a melt bath, and subsequent passage through the melt bath in which the steel flat product is hot-dip coated with a metallic coating;
 wherein the dew point of the heating atmosphere is higher than the dew point of the holding atmosphere, and the dew point of the holding atmosphere is higher than the dew point of the inlet atmosphere.

2. The method according to claim 1, wherein the holding temperature is 700 to 850° C.

3. The method according to claim 1, wherein the heating atmosphere further contains 1.0-5.0 vol. % H$_2$.

4. The method according to claim 1, wherein the heating is carried out in a directly heated furnace zone and the heating atmosphere further contains 1-50 vol. % H$_2$, 0.1-2.0 vol. % CO and 5.0-15.0 vol. % CO$_2$.

5. The method according to claim 1, wherein the H$_2$ content of the holding atmosphere is 1.0-5.0 vol. %.

6. The method according to claim 1, wherein the dew point of the holding atmosphere is −30° C. to −10° C.

7. The method according to claim 1, wherein the O$_2$ content of the holding atmosphere is maximum 0.1 vol. %.

8. The method according to claim 1, wherein following cooling to the strip inlet temperature, the steel flat product undergoes an overageing treatment in which the steel flat product is held for 1-30 s under an overageing atmosphere at the strip inlet temperature, that the overageing atmosphere contains N$_2$ and unavoidable contaminants, and optionally 1-50 vol. % H$_2$, and wherein a dew point of the overageing atmosphere is −50° C. to −25° C.

9. The method according to claim 8, wherein the H$_2$ content of the overageing atmosphere is 1.0-5.0 vol. %.

10. The method according to claim 8, wherein the dew point of the heating atmosphere is greater than the dew point of the holding atmosphere is greater than the dew point of the overageing atmosphere is greater than or equal to the dew point of the inlet atmosphere.

11. The method according to claim 1, wherein the inlet atmosphere consists of $N_2$ and unavoidable contaminants and optionally 1.0-50.0 vol. % $H_2$, and wherein a dew point of the inlet atmosphere is −80° C. to −25° C.

12. The method according to claim 1, wherein the steel flat product is immersed in the melt bath for 1-10 s.

13. The method according to claim 1, wherein the steel from which the steel flat product is produced contains by weight:
Cr: 5.0-30.0%
Ni: 2.0-30.0%
Mn: ≤6.0%
Mo: ≤5.0%
Si: ≤2.0%
Cu: ≤2.0%
Ti: ≤1.0%
Nb: ≤1.0%
V: ≤0.5%
N: ≤0.2%
Al: ≤2.0%
C: ≤0.5%, and
the balance being iron and unavoidable contaminants.

* * * * *